US012415285B2

(12) United States Patent
Meduna et al.

(10) Patent No.: US 12,415,285 B2
(45) Date of Patent: Sep. 16, 2025

(54) INTEGRATED MOBILE MANIPULATOR ROBOT WITH ACCESSORY INTERFACES

(71) Applicant: Boston Dynamics, Inc., Waltham, MA (US)

(72) Inventors: Matthew Meduna, Waltham, MA (US); Michael Murphy, Carlisle, MA (US); Guillermo Diaz-Lankenau, Santa Clara, MA (US); Chris Hamilton, Arlington, MA (US); John Aaron Saunders, Arlington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 540 days.

(21) Appl. No.: 17/699,528

(22) Filed: Mar. 21, 2022

(65) Prior Publication Data

US 2022/0305672 A1    Sep. 29, 2022

Related U.S. Application Data

(60) Provisional application No. 63/166,762, filed on Mar. 26, 2021.

(51) Int. Cl.
*B25J 15/04*    (2006.01)
*B25J 5/00*    (2006.01)
(Continued)

(52) U.S. Cl.
CPC ........... *B25J 15/0466* (2013.01); *B25J 5/007* (2013.01); *B25J 15/0483* (2013.01);
(Continued)

(58) Field of Classification Search
CPC .... B25J 15/0466; B25J 5/007; B25J 15/0483; B25J 19/0025; B25J 19/005; B25J 19/021; B25J 19/027
(Continued)

(56) References Cited

U.S. PATENT DOCUMENTS 4,789,295 A   12/1988  Boucher, Jr. et al.
6,588,574 B2   7/2003  Koini et al.
(Continued)

FOREIGN PATENT DOCUMENTS

JP   2008229738 A   10/2008
WO   1998051598 A1   11/1998
(Continued)

OTHER PUBLICATIONS

International Preliminary Report on Patentability for International Application No. PCT/US2022/021142 dated Sep. 12, 2023; 11 pages.
(Continued)

*Primary Examiner* — Kira Nguyen
(74) *Attorney, Agent, or Firm* — PIERCE ATWOOD LLP

(57) ABSTRACT

A robot comprises a mobile base, a robotic arm operatively coupled to the mobile base, and at least one interface configured to enable selective coupling to at least one accessory. The at least one interface comprises an electrical interface configured to transmit power and/or data between the robot and the at least one accessory, and a mechanical interface configured to enable physical coupling between the robot and the at least one accessory.

33 Claims, 13 Drawing Sheets

(51) Int. Cl.
*B25J 19/00* (2006.01)
*B25J 19/02* (2006.01)

(52) U.S. Cl.
CPC ......... *B25J 19/0025* (2013.01); *B25J 19/005* (2013.01); *B25J 19/021* (2013.01); *B25J 19/027* (2013.01)

(58) Field of Classification Search
USPC ........................................................ 700/245
See application file for complete search history.

(56) References Cited

U.S. PATENT DOCUMENTS

| | | |
|---|---|---|
| 7,153,085 B2 | 12/2006 | Clark et al. |
| 8,295,980 B2 | 10/2012 | Williamson |
| 8,965,563 B2 | 2/2015 | Eldershaw et al. |
| 9,004,846 B2 | 4/2015 | La Rovere et al. |
| 9,089,969 B1 | 7/2015 | Theobald |
| 9,102,053 B2 | 8/2015 | Suzuki |
| 9,233,470 B1 | 1/2016 | Bradski et al. |
| 9,434,558 B2 | 9/2016 | Criswell |
| 9,451,810 B2 | 9/2016 | Regan et al. |
| 9,481,530 B2 | 11/2016 | Brandmüller et al. |
| 9,487,361 B2 | 11/2016 | Girtman et al. |
| 9,493,316 B2 | 11/2016 | Girtman et al. |
| 9,503,704 B2 | 11/2016 | Ando |
| 9,519,882 B2 | 12/2016 | Galluzzo et al. |
| 9,604,363 B2 | 3/2017 | Ban |
| 9,688,489 B1 | 6/2017 | Zevenbergen et al. |
| 9,744,669 B2 | 8/2017 | Wicks et al. |
| 9,875,911 B2 | 1/2018 | Pagaila et al. |
| 9,919,872 B2 | 3/2018 | Khodl et al. |
| 9,940,604 B2 | 4/2018 | Galluzzo et al. |
| 9,969,573 B2 | 5/2018 | Girtman et al. |
| 9,987,746 B2 | 6/2018 | Bradski et al. |
| 10,005,627 B2 | 6/2018 | Girtman et al. |
| 10,071,856 B2 | 9/2018 | Hance et al. |
| 10,108,185 B1 | 10/2018 | Theobald |
| 10,122,995 B2 | 11/2018 | Rublee et al. |
| 10,124,489 B2 | 11/2018 | Chitta et al. |
| 10,124,967 B2 | 11/2018 | Girtman et al. |
| 10,147,069 B2 | 12/2018 | Galluzzo et al. |
| 10,216,865 B1 | 2/2019 | Theobald |
| 10,239,210 B2 | 3/2019 | Morency et al. |
| 10,343,857 B2 | 7/2019 | Morency et al. |
| 10,417,521 B2 | 9/2019 | Dong |
| 10,518,973 B2 | 12/2019 | Hance et al. |
| 10,661,444 B2 | 5/2020 | McCollum et al. |
| 10,766,149 B2 | 9/2020 | Marchese et al. |
| 10,793,047 B1 | 10/2020 | Theobald |
| 2006/0182607 A1 | 8/2006 | Clark et al. |
| 2013/0017053 A1 | 1/2013 | Forget et al. |
| 2014/0079524 A1 | 3/2014 | Shimono et al. |
| 2015/0066199 A1 | 3/2015 | Shimono |
| 2016/0221187 A1 | 8/2016 | Bradski et al. |
| 2017/0072558 A1* | 3/2017 | Reynolds ............... G05D 1/024 |
| 2018/0222695 A9 | 8/2018 | Girtman et al. |
| 2018/0370377 A1* | 12/2018 | Blacksberg ........... H02J 7/0013 |
| 2019/0155296 A1* | 5/2019 | Moore ................. H02J 7/0045 |
| 2019/0242916 A1* | 8/2019 | Guarracina ............ B25J 9/1676 |
| 2019/0381617 A1* | 12/2019 | Patrini ................. B25J 15/0491 |
| 2021/0101748 A1* | 4/2021 | Helsel ................. G05D 1/0238 |
| 2021/0221612 A1* | 7/2021 | Rogers ................. B65G 1/1371 |
| 2022/0063085 A1* | 3/2022 | Chintamani ............ B66F 9/18 |
| 2024/0093650 A1* | 3/2024 | Bagnariol ............. F02D 31/006 |

FOREIGN PATENT DOCUMENTS

| | | |
|---|---|---|
| WO | 2014041318 A1 | 3/2014 |
| WO | 2014111633 A1 | 7/2014 |
| WO | 2014113762 A1 | 7/2014 |
| WO | 2014186781 A1 | 11/2014 |
| WO | 2015017444 A1 | 2/2015 |
| WO | 2015035300 A1 | 3/2015 |
| WO | 2015187975 A1 | 12/2015 |
| WO | 2016014917 A1 | 1/2016 |
| WO | 2016033172 A1 | 3/2016 |
| WO | 2017146895 A1 | 8/2017 |
| WO | 20170136429 A1 | 8/2017 |
| WO | 2018022265 A1 | 2/2018 |
| WO | 2010034044 A2 | 4/2020 |

OTHER PUBLICATIONS

International Search Report and Written Opinion mailed Aug. 22, 2022, in connection with International Application No. PCT/US2022/021142.

* cited by examiner

INTEGRATED MOBILE MANIPULATOR ROBOT WITH ACCESSORY INTERFACES

CROSS-REFERENCE TO RELATED APPLICATIONS

This application claims priority under 35 U.S.C. § 119(e) to U.S. Provisional Application Ser. No. 63/166,762, filed Mar. 26, 2021, titled, "AN INTEGRATED MOBILE MANIPULATOR ROBOT WITH ACCESSORY INTERFACES," which is incorporated by reference in its entirety herein.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transportation, hazardous environments, exploration, and healthcare.

SUMMARY

Some embodiments relate to a robot comprising a mobile base, a robotic arm operatively coupled to the mobile base, and at least one interface configured to enable selective coupling to at least one accessory. The at least one interface comprises an electrical interface configured to transmit power and/or data between the robot and the at least one accessory, and a mechanical interface configured to enable physical coupling between the robot and the at least one accessory.

In one aspect, the robot further comprises a coupling sensor configured to determine if the robot and the at least one accessory are physically coupled through the mechanical interface. In another aspect, the coupling sensor is a magnetic sensor. In another aspect, the magnetic sensor is a hall effect sensor. In another aspect, the magnetic sensor is a reed switch. In another aspect, the coupling sensor is a contactless sensor. In another aspect, the robot further comprises a computer processor configured to receive a signal from the coupling sensor and output an error when it is determined based on the received signal that the robot and the at least one accessory are physically coupled through the mechanical interface and that an electrical connector of the electrical interface is not connected to a corresponding connector of the at least one accessory.

In one aspect, the at least one interface comprises a first interface and a second interface. The first interface comprises a first electrical interface configured transmit power and/or data between the robot and a first accessory and a first mechanical interface configured to enable a first physical coupling between the robot and the first accessory. The second interface comprises a second mechanical interface configured to enable a second physical coupling between the robot and a second accessory, and a second coupling sensor configured to determine if the robot and the second accessory are physically coupled through the second mechanical interface. In another aspect, the second mechanical interface is incompatible with the first accessory such that the first accessory cannot couple to the robot through the second mechanical interface. In another aspect, the first mechanical interface is incompatible with the second accessory such that the second accessory cannot couple to the robot through the first mechanical interface. In another aspect, the first mechanical interface is disposed on a first side of the robot, and wherein the second mechanical interface is disposed on a second side of the robot opposite the first side of the robot. In another aspect, the robot further comprises a battery charging port disposed on the first side of the robot or the second side of the robot.

Some embodiments relate to a system comprising a robot and a cart accessory. The robot comprises a mobile base, a robotic arm operatively coupled to the mobile base, and an accessory interface. The cart accessory is operatively coupled to the robot through the accessory interface. The cart accessory comprises a cart body having a flat surface on which one or more objects can be placed, and a plurality of wheels coupled to the cart body.

In one aspect, the robot comprises one or more distance sensors, wherein the cart accessory includes a first side operatively coupled to the robot and a second side opposite the first side, the second side facing an environment, and wherein at least one distance sensor of the one or more distance sensors is disposed on the robot to have a field of view that includes an area of the environment that the second side of the cart faces. In another aspect, the robot comprises a plurality of distance sensors, wherein a first field of view of a first distance sensor of the plurality of distance sensors at least partially overlaps a second field of view of a second distance sensor of the plurality of distance sensors. In another aspect, at least one of the plurality of wheels occludes an area of the first field of view when the cart accessory is coupled to the robot, and the second distance sensor is arranged such that the second field of view includes at least some of the occluded area of the first field of view. In another aspect, the first distance sensor and the second distance sensor are arranged on the robot such that a maximum dimension of a portion of the occluded area of the first field of view not included in the second field of view is less than a predetermined dimension. In another aspect, the predetermined dimension is 100 millimeters. In another aspect, the predetermined dimension is 75 millimeters.

In one aspect, the robot comprises a distance sensor disposed on a same side of the robot as the accessory interface, and a field of view of the distance sensor includes an area under the cart accessory. In another aspect, the robot is configured to receive information identifying the cart accessory, and wherein the robot is configured to adjust an operation of the robot based on the received information. In another aspect, the received information includes cart size information, and the robot is configured to adjust an operation of the mobile base based on the cart size information. In another aspect, the received information includes cart size information, and the robot is configured to adjust one or more safety protocols based on the cart size information.

In one aspect, the robot comprises a reader configured to read an identifier tag located on the cart accessory, and receiving information identifying the cart accessory comprises receiving the information in response to reading the identifier tag. In another aspect, the information identifying the cart accessory is received by the robot through the accessory interface. In another aspect, each of the plurality of wheels of the cart assembly is passive. In another aspect, at least one of the plurality of wheels of the cart assembly is configured to be actively steered and/or driven.

Some embodiments relate to a system comprising a robot and a pendant accessory. The robot comprises a mobile base, a robotic arm operatively coupled to a mobile base, and an accessory interface. The pendant accessory is operatively coupled to the robot through the accessory interface. The pendant accessory is configured to enable a user to operate the robot through a user interface of the pendant accessory.

In one aspect, the pendant accessory is configured to enable the user to control one or more operations of the mobile base. In another aspect, the pendant accessory is configured to enable the user to control one or more operations of the robotic arm. In another aspect, one or more safety protocols of the robot are configured to be disabled when the pendant accessory is coupled to the robot through the accessory interface. In another aspect, the pendant accessory comprises a momentary switch, and the one or more safety protocols of the robot are configured to be disabled only when the momentary switch is activated. In another aspect, the pendant accessory comprises a momentary switch, wherein the pendant accessory is configured to enable the user to operate the robot only when the momentary switch is activated. In another aspect, the pendant accessory is powered by the robot when the pendant accessory is coupled to the robot through the accessory interface. In another aspect, the user interface of the pendant accessory comprises at least one joystick and at least one button. In another aspect, the user interface of the pendant accessory comprises at least one touchscreen. In another aspect, the at least one touchscreen is selectively removable from a remainder of the pendant. In another aspect, the at least one touchscreen is powered by the pendant when coupled to the remainder of the pendant.

Some embodiments relate to a method comprising mechanically coupling an accessory to a robot through a mechanical interface of the robot, wherein the robot comprises a robotic arm operatively coupled to a mobile base. The method comprises sensing, using a coupling sensor, whether the robot and the accessory are mechanically coupled. The method additionally comprises electrically coupling the accessory to the robot through an electrical interface of the robot, determining whether the accessory is electrically coupled to the robot, and transmitting information between the robot and the accessory through the electrical interface.

In one aspect, the method further comprises entering an error state when a computer processor determines, based on a signal from the coupling sensor, that the robot and the accessory are mechanically coupled and determines that the robot and the accessory are not electrically coupled. In another aspect, transmitting information between the robot and the accessory comprises transmitting accessory information from the accessory to the robot. In another aspect, the method further comprises adjusting an operation of the robot based on the transmitted accessory information. In another aspect, adjusting the operation of the robot comprises adjusting an operation of the mobile base. In another aspect, adjusting the operation of the robot comprises adjusting one or more safety protocols. In another aspect, transmitting information between the robot and the accessory comprises transmitting accessory size information from the accessory to the robot.

In one aspect, the method further comprises adjusting an operation of the robot based on the transmitted accessory size information. In another aspect, adjusting the operation of the robot comprises adjusting an operation of the mobile base. In another aspect, adjusting the operation of the robot comprises adjusting one or more safety protocols. In another aspect, the method further comprises transmitting power between the robot and the accessory through the electrical interface.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
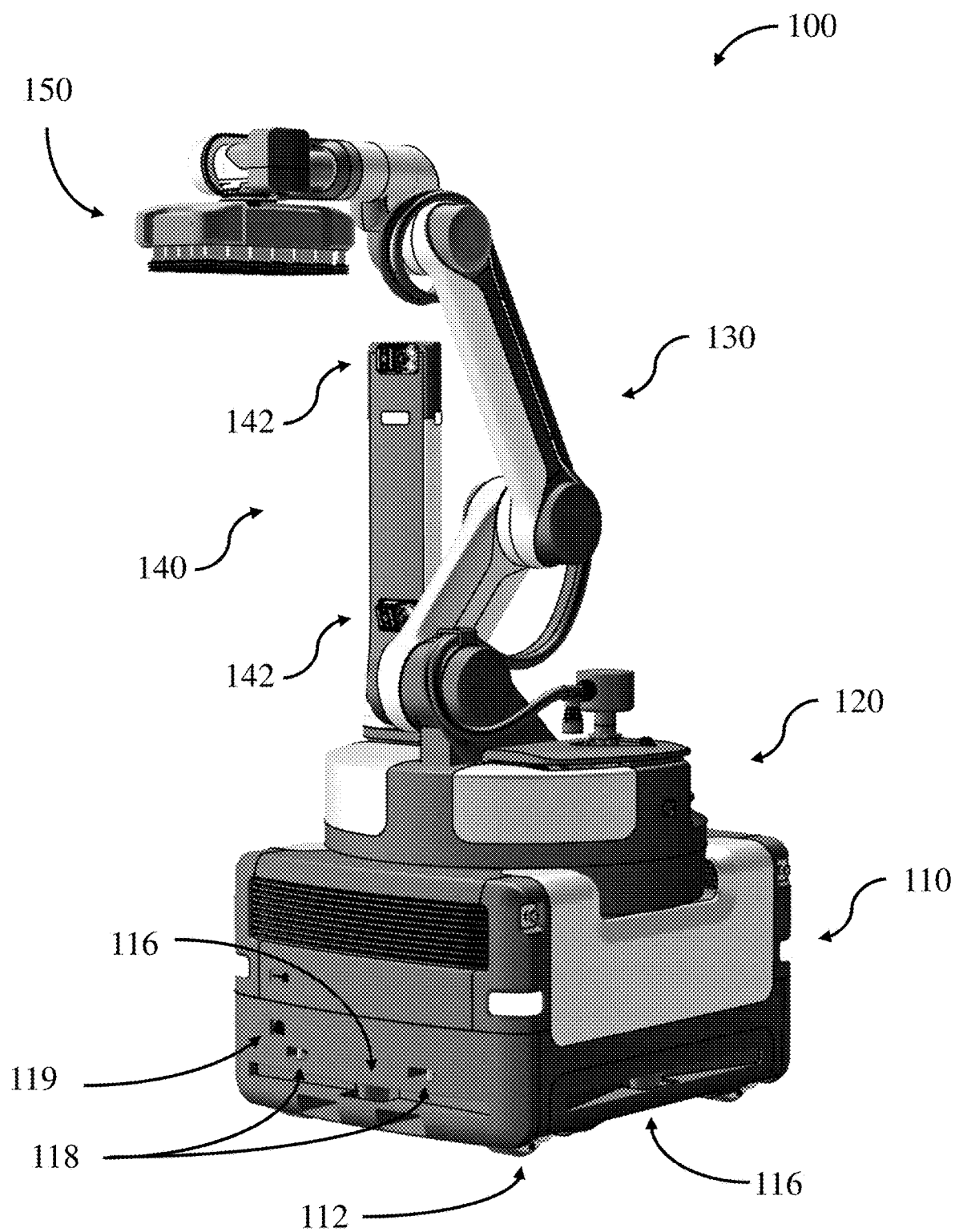
FIG. 1A is a perspective view of one embodiment of a robot.

Robots are typically configured to perform various tasks in an environment in which they are placed. Generally, these tasks include interacting with objects and/or the elements of the environment. Notably, robots are becoming popular in warehouse and logistics operations. Before the introduction of robots to such spaces, many operations were performed manually. For example, a person might manually unload boxes from a truck onto one end of a conveyor belt, and a second person at the opposite end of the conveyor belt might organize those boxes onto a pallet. The pallet may then be picked up by a forklift operated by a third person, who might drive to a storage area of the warehouse and drop the pallet for a fourth person to remove the individual boxes from the pallet and place them on shelves in the storage area. More recently, robotic solutions have been developed to automate many of these functions. Such robots may either be specialist robots (i.e., designed to perform a single task, or a small number of closely related tasks) or generalist robots (i.e., designed to perform a wide variety of tasks). To date, both specialist and generalist warehouse robots have been associated with significant limitations, as explained below.

A specialist robot may be designed to perform a single task, such as unloading boxes from a truck onto a conveyor belt. While such specialized robots may be efficient at performing their designated task, they may be unable to perform other, tangentially related tasks in any capacity. As such, either a person or a separate robot (e.g., another specialist robot designed for a different task) may be needed to perform the next task(s) in the sequence. As such, a warehouse may need to invest in multiple specialized robots to perform a sequence of tasks, or may need to rely on a hybrid operation in which there are frequent robot-to-human or human-to-robot handoffs of objects.

In contrast, a generalist robot may be designed to perform a wide variety of tasks, and may be able to take a box through a large portion of the box's life cycle from the truck to the shelf (e.g., unloading, palletizing, transporting, depalletizing, storing). While such generalist robots may perform a variety of tasks, they may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible. Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task. As should be appreciated from the foregoing, the mobile base and the manipulator in such systems are effectively two separate robots that have been joined together; accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while there are limitations that arise from a purely engineering perspective, there are additional limitations that must be imposed to comply with safety regulations. For instance, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not pose a threat to the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, the inventors have recognized and appreciated that a highly integrated mobile manipulator robot with system-level mechanical design and holistic control strategies between the manipulator and the mobile base may be associated with certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

To further increase the utility of a mobile manipulator robot in warehouse operations, the inventors have additionally recognized and appreciated that a mobile manipulator robot with one or more interfaces configured to enable coupling to different accessories may be associated with certain benefits. For example, a robot with an accessory interface could be configured to couple to a cart that supports a pallet, thereby providing a surface onto which the robot may stack boxes or other objects. Accessory interfaces may allow a mobile manipulator robot to engage with accessories that may modify or enhance the baseline capabilities of the robot, thereby enabling more effective operation in a variety of different tasks.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
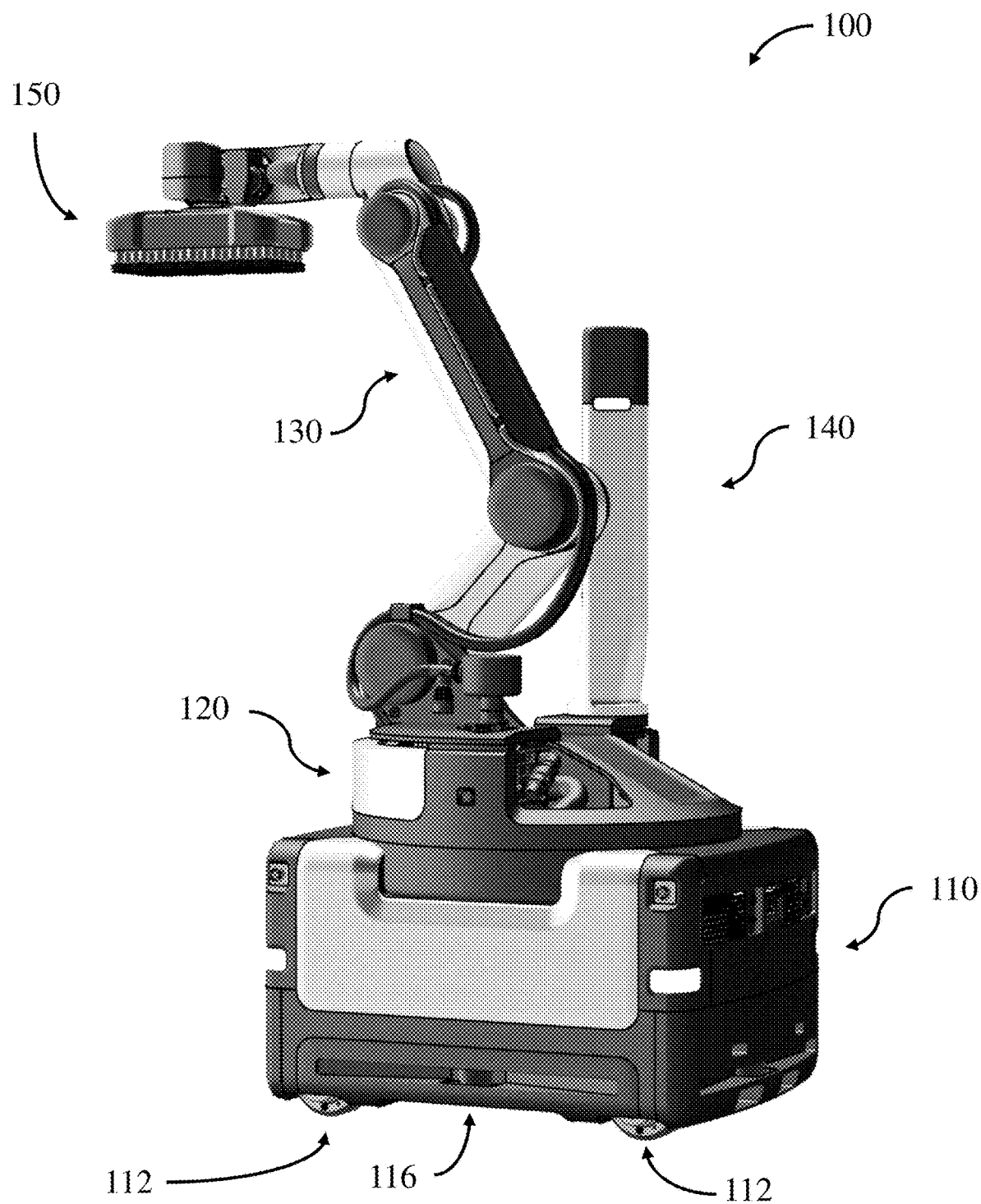
FIG. 1B is another perspective view of the robot of FIG. 1A.

FIGS. 1A and 1B are perspective views of one embodiment of a robot 100. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The mobile base is configured to interface with various accessories through accessory interfaces, such as a mechanical interface 118 and/or an electrical interface 119. Some accessories configured to attach to mechanical interface 118 and/or electrical interface 119 may be designed to facilitate performance of one or more particular tasks performed by the robot 100. For instance, a cart that is pulled by the robot, or a conveyor to which the robot anchors itself may facilitate performance of an object manipulation task in which objects (e.g., boxes) manipulated by the robot can be placed on or removed from the accessory. Other accessories configured to attach to mechanical interface 118 and/or electrical interface 119 may be designed to facilitate operation of the robot itself. For instance, some accessories when coupled to the robot 100 may interact with power systems and/or control systems of the robot. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
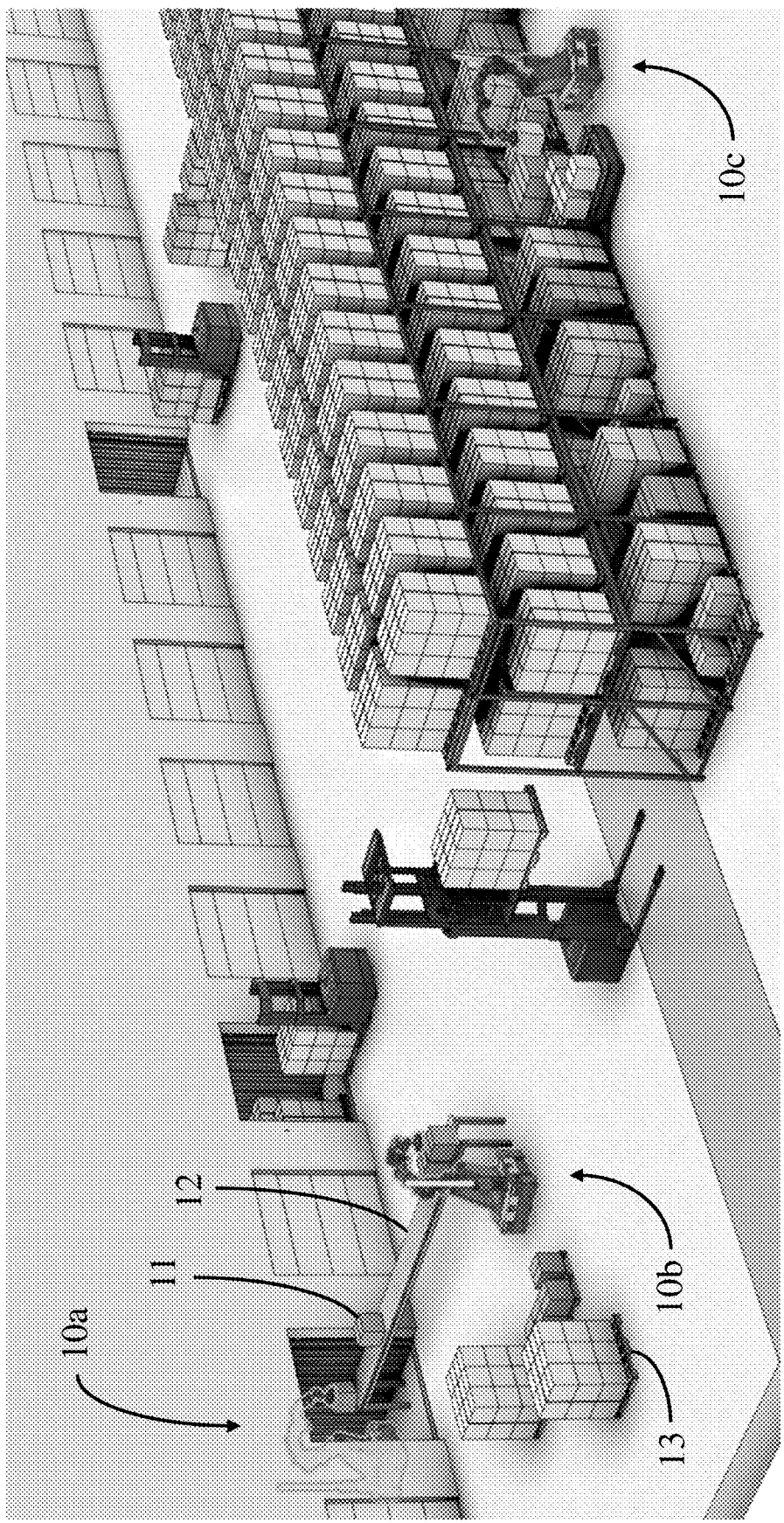
FIG. 2A depicts robots performing tasks in a warehouse environment.

FIG. 2A depicts robots 10a, 10b, and 10c performing different tasks within a warehouse environment. A first robot 10a is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10b organizes the boxes 11 onto a pallet 13. In a separate area of the warehouse, a third robot 10c picks boxes from shelving to build an order on a pallet (this particular task will be discussed in greater detail below in reference to FIG. 2C). It should be appreciated that the robots 10a, 10b, and 10c are different instances of the same robot (or of highly similar robots). Accordingly, the robots described herein may be understood as specialized multi-purpose robots, in that they are designed to perform specific tasks accurately and efficiently, but are not limited to only one or a small number of specific tasks.

Figure 2B:
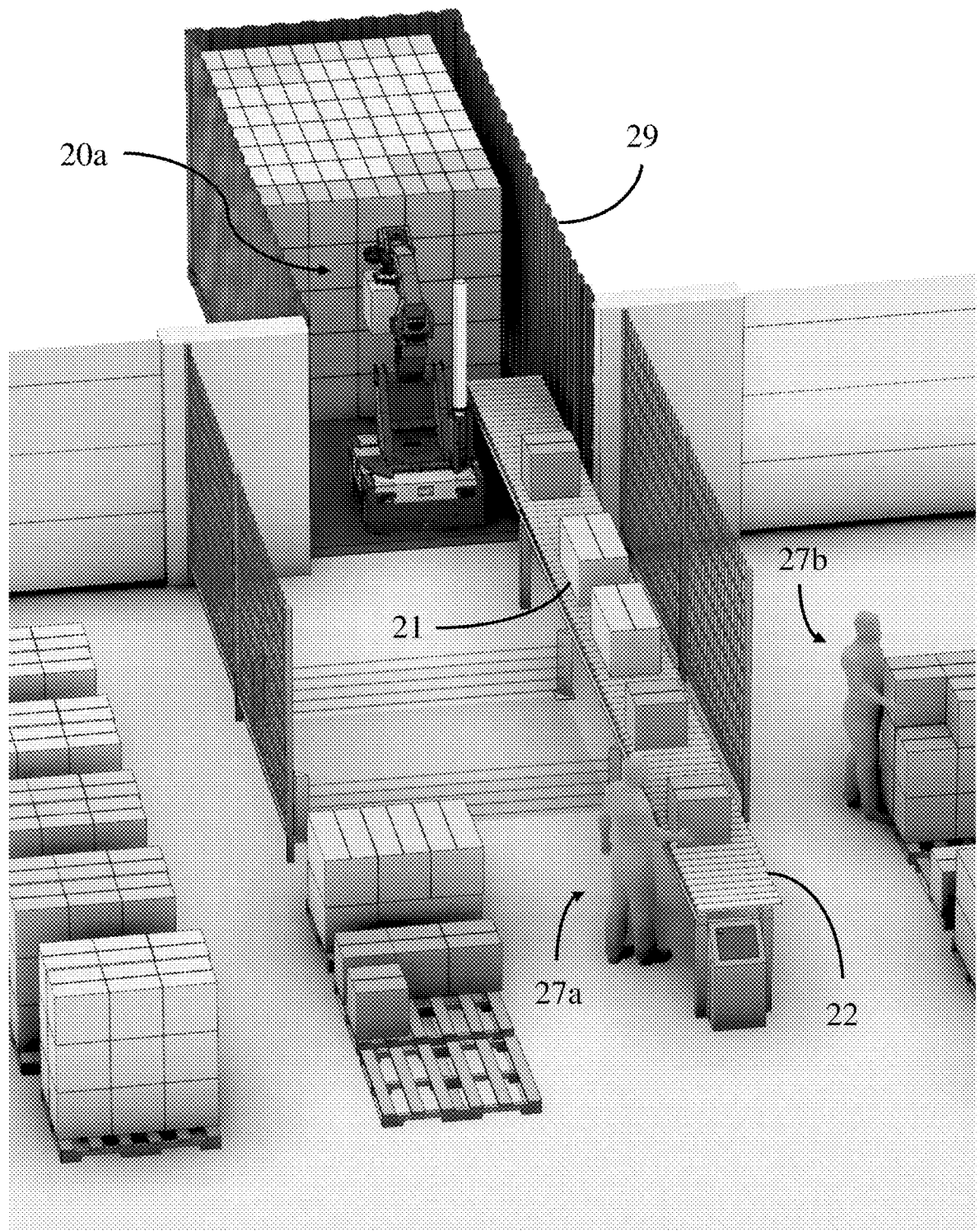
FIG. 2B depicts a robot unloading boxes from a truck.

FIG. 2B depicts a robot 20a unloading boxes 21 from a truck 29 and placing them on a conveyor belt 22. In this box picking application (as well as in other box picking applications), the robot 20a will repetitiously pick a box, rotate, place the box, and rotate back to pick the next box. Although robot 20a of FIG. 2B is a different embodiment from robot 100 of FIGS. 1A and 1i, referring to the components of robot 100 identified in FIGS. 1A and 1B will ease explanation of the operation of the robot 20a in FIG. 2B. During operation, the perception mast of robot 20a (analogous to the perception mast 140 of robot 100 of FIGS. 1A and 1B) may be configured to rotate independent of rotation of the turntable (analogous to the turntable 120) on which it is mounted to enable the perception modules (akin to perception modules 142) mounted on the perception mast to capture images of the environment that enable the robot 20a to plan its next movement while simultaneously executing a current movement. For example, while the robot 20a is picking a first box from the stack of boxes in the truck 29, the perception modules on the perception mast may point at and gather information about the location where the first box is to be placed (e.g., the conveyor belt 22). Then, after the turntable rotates and while the robot 20a is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20a may parallelize tasks which may otherwise have been performed sequentially, thus enabling faster and more efficient operation.

Also of note in FIG. 2B is that the robot 20a is working alongside humans (e.g., workers 27a and 27b). Given that the robot 20a is configured to perform many tasks that have traditionally been performed by humans, the robot 20a is designed to have a small footprint, both to enable access to areas designed to be accessed by humans, and to minimize the size of a safety zone around the robot into which humans are prevented from entering.

Figure 2C:
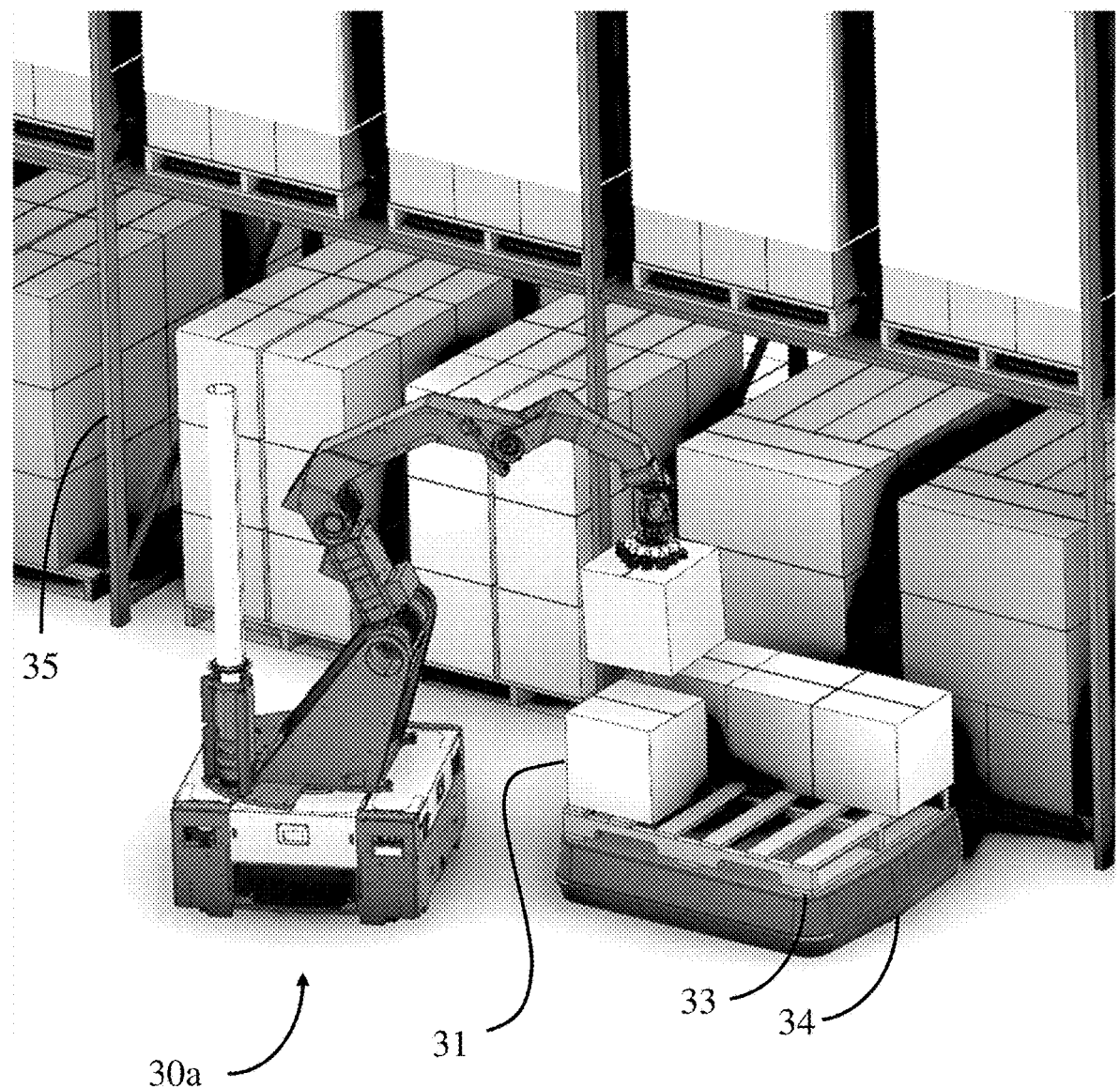
FIG. 2C depicts a robot building a pallet in a warehouse aisle.

FIG. 2C depicts a robot 30a performing an order building task, in which the robot 30a places boxes 31 onto a pallet 33. In FIG. 2C, the pallet 33 is disposed on top of an autonomous mobile robot (AMR) 34, but it should be appreciated that the capabilities of the robot 30a described in this example apply to building pallets not associated with an AMR. In this task, the robot 30a picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

Of course, it should be appreciated that the tasks depicted in FIGS. 2A-2C are but a few examples of applications in which an integrated mobile manipulator robot may be used, and the present disclosure is not limited to robots configured to perform only these specific tasks. For example, the robots described herein may be suited to perform tasks including, but not limited to, removing objects from a truck or container, placing objects on a conveyor belt, removing objects from a conveyor belt, organizing objects into a stack, organizing objects on a pallet, placing objects on a shelf, organizing objects on a shelf, removing objects from a shelf, picking objects from the top (e.g., performing a "top pick"), picking objects from a side (e.g., performing a "face pick"), coordinating with other mobile manipulator robots, coordinating with other warehouse robots (e.g., coordinating with AMRs), coordinating with humans, and many other tasks.

Example Accessory Interfaces

As described above, a highly integrated mobile manipulator robot includes a mobile base and a robotic arm. The mobile base is configured to move the robot to different locations to enable interactions between the robotic arm and different objects of interest. In some embodiments, the mobile base may include an accessory interface configured to enable selective coupling to different accessories. As briefly noted above, accessories may include accessories that facilitate performance of object manipulation tasks by the robot. For example, a cart accessory may be attached to the mobile base through an accessory interface. A cart accessory may be passive (e.g., may be pulled by the robot as the mobile base moves the robot), or may be active (e.g., may have some powered and/or active components, such as steerable and/or drivable wheels). The cart accessory may include a flat surface, which may be used to support a pallet onto which the robot may place boxes or other objects, such as in an order building task as described above in relation to FIG. 2C. That is, although an AMR 34 is shown supporting the pallet 33 in FIG. 2C, a cart accessory (such as cart accessory 390 discussed below in relation to FIG. 3B) may be used to support a pallet in an order building task. As another example of an accessory configured to facilitate performance of an object manipulation task, the robot may be configured to couple to a conveyor through an accessory interface. Coupling to a fixed conveyor (e.g., a conveyor that is constrained to remain in place) may be advantageous in anchoring the robot as the robot loads boxes or other objects onto the conveyor, while coupling to a free conveyor (e.g., a conveyor that is unconstrained and free to move) may be advantageous in enabling the robot to move and/or reorient the conveyor as the robot performs a task.

Other accessories may (when connected to the robot) interact with one or more power systems and/or control systems of the robot. For example, a pendant accessory may include a user interface through which a user may interact to operate the robot, such as by controlling one or more operations of the mobile base and/or the robotic arm. Throughout the present disclosure, reference may be made primarily to a few specific accessories, for consistency and ease of description. However, it should be understood that a mobile manipulator robot with one or more accessory interfaces may be configured to couple to any suitable number of different accessories, and that the present disclosure is not limited to the types of accessories specifically described here.

Figure 3A:
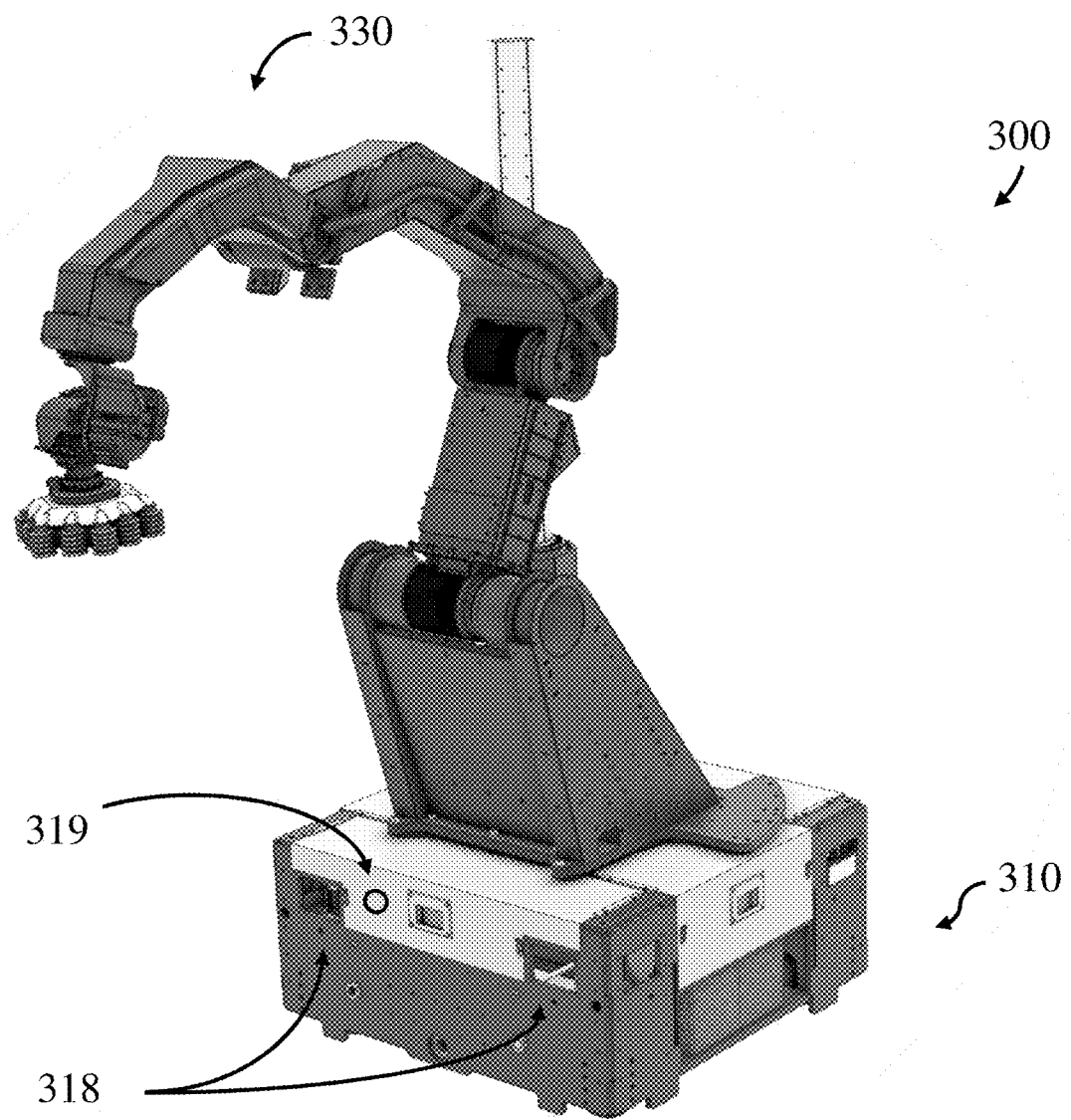
FIG. 3A depicts one embodiment of an accessory interface of a robot.

One embodiment of an accessory interface is depicted in FIG. 3A. In FIG. 3A, a mobile manipulator robot 300 that includes a mobile base 310 and a robotic arm 330 includes both a mechanical interface 318 and an electrical interface 319. The mechanical interface 318 may be configured to enable physical coupling between the robot and an accessory. For instance, the mechanical interface may be configured to transmit one or more forces and/or torques between the robot and the accessory. As a particular example, when a cart accessory is coupled to the robot through a mechanical interface, the mechanical interface may be configured to sustain sufficient loads to enable the mobile base of the robot to move (e.g., push or pull) the cart accessory. The electrical interface 319 may be configured to transmit power and/or data between the robot and the accessory. As used herein, the term "accessory interface" may refer to a mechanical interface of a robot, an electrical interface of a robot, both a mechanical interface and an electrical interface of a robot collectively, or any other interface of a robot configured to enable coupling to and/or coordination with one or more accessories. It should be appreciated that some accessories may be configured to couple to a robot using only a mechanical interface, some accessories may be configured to couple to a robot using only an electrical interface, and some accessories may be configured to couple to a robot using both a mechanical interface and an electrical interface. Furthermore, it should be appreciated that some interfaces (whether mechanical, electrical, or other) may be specific to certain accessories (e.g., to a specific accessory or to a specific type of accessory), while other interfaces may be universal and configured to accept many different accessories. Although the examples described herein show a mechanical interface and an electrical interface being distinct interfaces formed on the robot, it should be appreciated that in some embodiments, an accessory interface includes an integrated interface that includes both mechanical and electrical interfaces. The details of accessory interfaces designed in accordance with some embodiments are elucidated in the examples below.

Figure 3B:
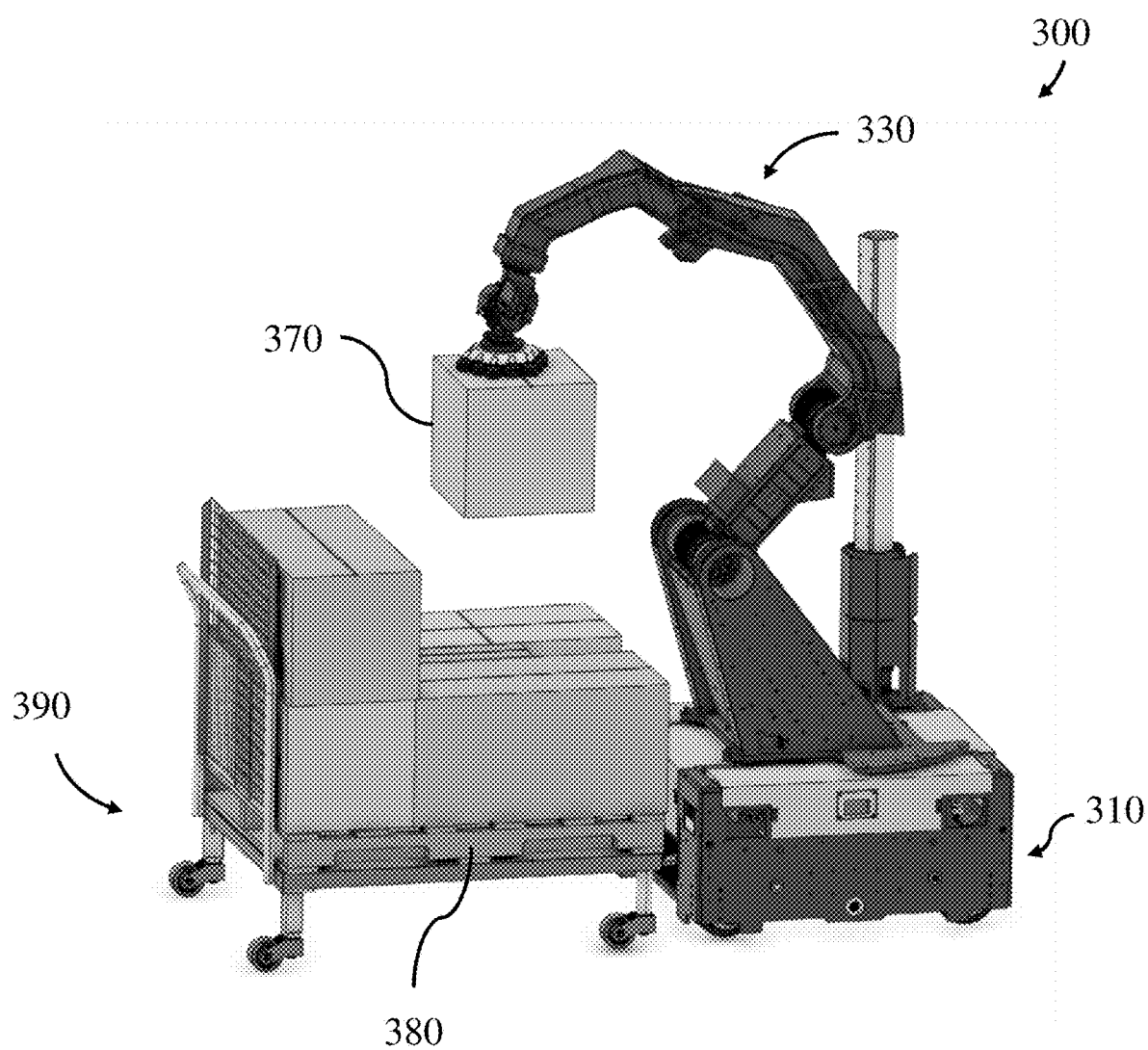
FIG. 3B depicts a robot coupled to a cart accessory through a mechanical interface of the accessory interface of FIG. 3A.

As previously stated, one example of an accessory is a cart accessory. Referring to FIG. 3B, the mobile manipulator robot 300 may be configured to couple to a cart accessory 390 through an accessory interface. The cart accessory 390 may be configured to support a pallet 380 on which boxes 370 or other objects can be placed. Just as the robot 300 is configured to couple to the cart accessory through an accessory interface, the cart accessory 390 (or any other accessory) may be configured to couple to the robot through a robot interface. That is, an accessory interface of a robot (which may include a mechanical interface and/or an electrical interface, as described above in relation to FIG. 3A) may be configured to couple to a robot interface of an accessory. In the embodiment of FIG. 3B, the cart accessory 390 is passive, such that the cart accessory couples to the robot 300 through a mechanical interface 318, as will be described in greater detail below in reference to FIGS. 4A-4F. However, it should be appreciated that a cart accessory may, in some embodiments, include one or more powered components, such that the cart accessory may couple to a robot through both a mechanical interface and an electrical interface, wherein the electrical interface may be configured to provide power from the robot to the one or more powered components of the coupled cart accessory.

Figure 3C:
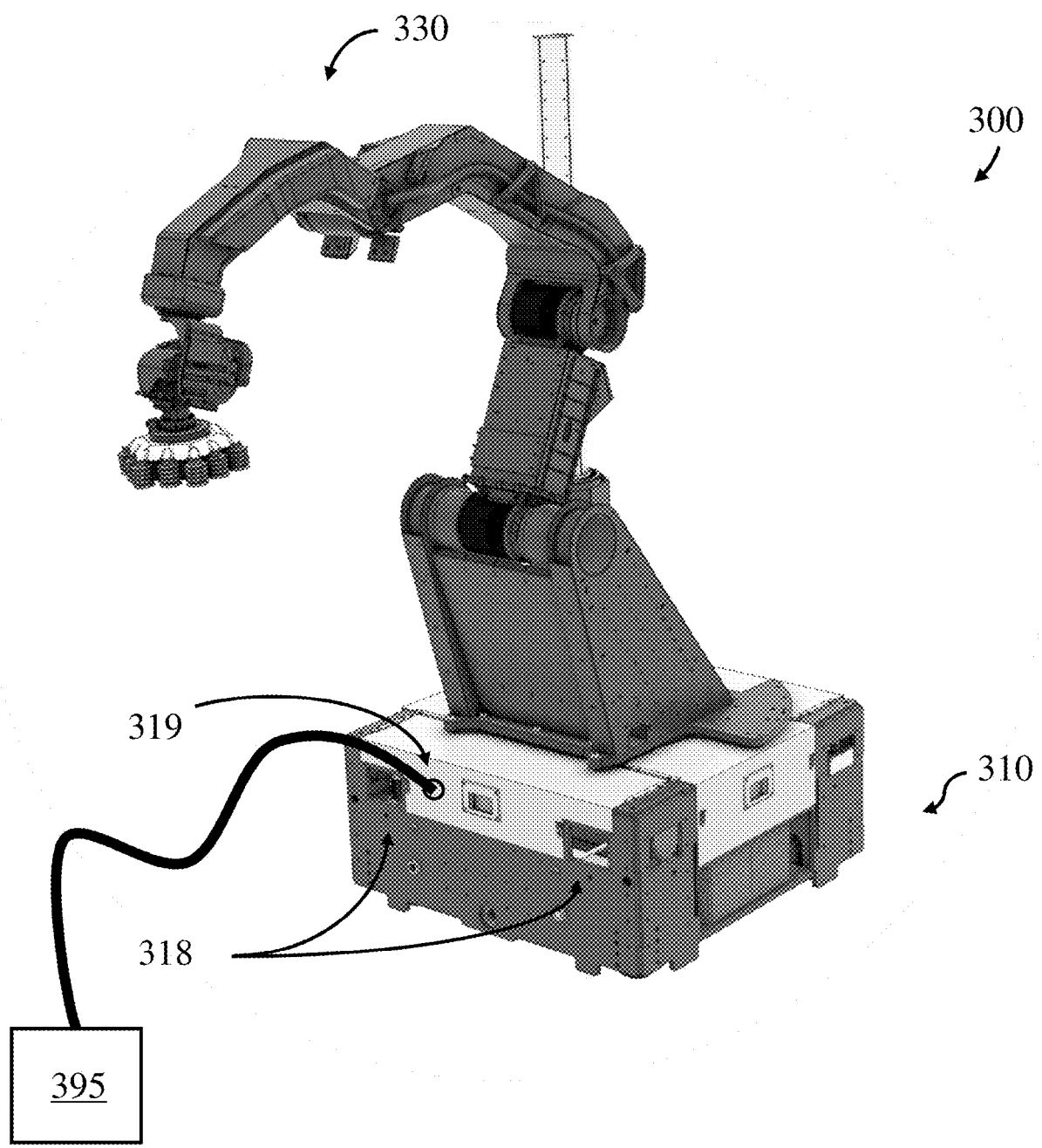
FIG. 3C depicts a robot coupled to a pendant accessory through an electrical interface of the accessory interface of FIG. 3A.

FIG. 3C depicts one embodiment of a pendant accessory 395 configured to couple to the robot 300 through the electrical interface 319. The pendant accessory 395 may be configured to enable a user to operate the robot 300 through a user interface of the pendant accessory 395, as will be explained in greater detail below in reference to FIG. 6.

Figure 4A:
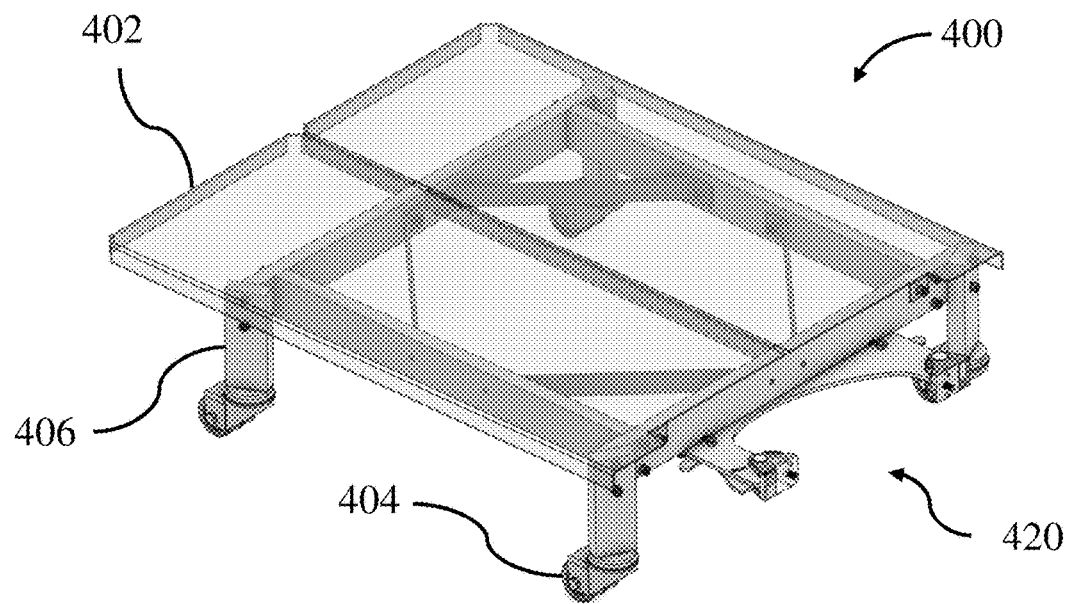
FIG. 4A is a perspective view of one embodiment of a cart accessory for a robot.
Figure 4B:
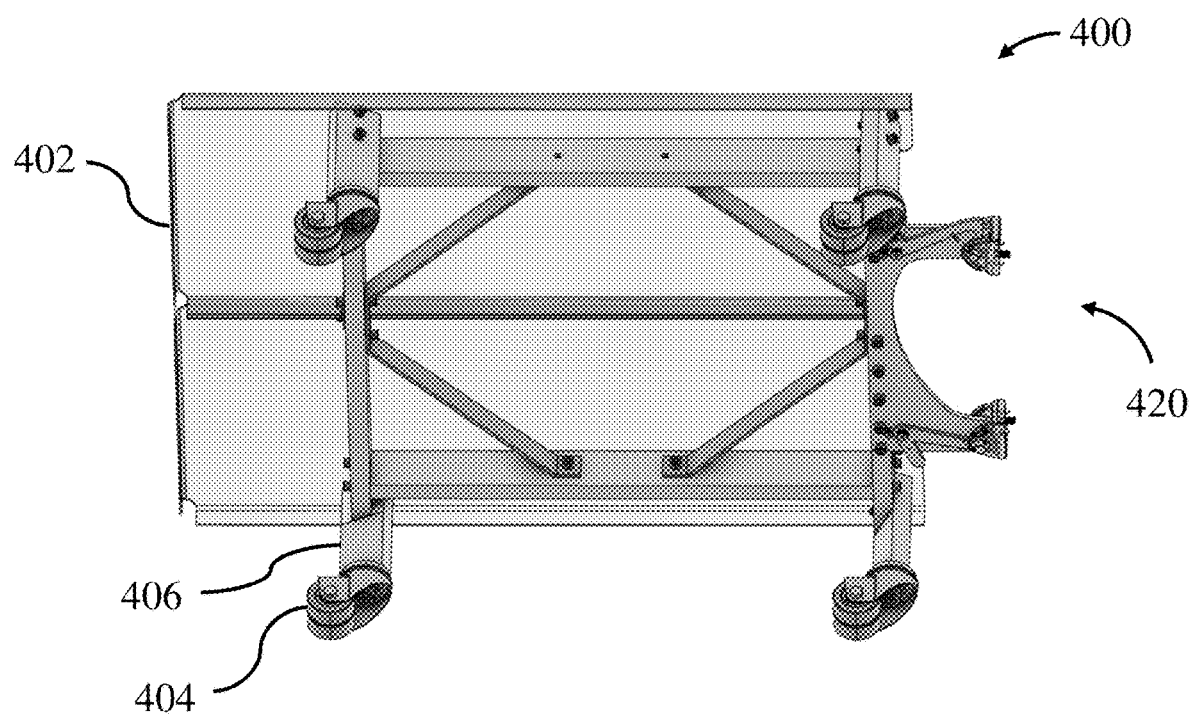
FIG. 4B is another perspective view of the cart accessory of FIG. 4A.

FIGS. 4A and 4B depict one embodiment of a cart accessory 400. The cart accessory 400 includes a cart body having a flat surface 402 on which one or more objects (e.g., boxes) can be placed. The cart accessory 400 also includes multiple wheels 404 which are coupled to the cart body by legs 406. The cart accessory 400 additionally includes a robot interface 420 configured to mate with an accessory interface of a robot, as described below in reference to FIGS. 4C and 4D.

Figure 4C:
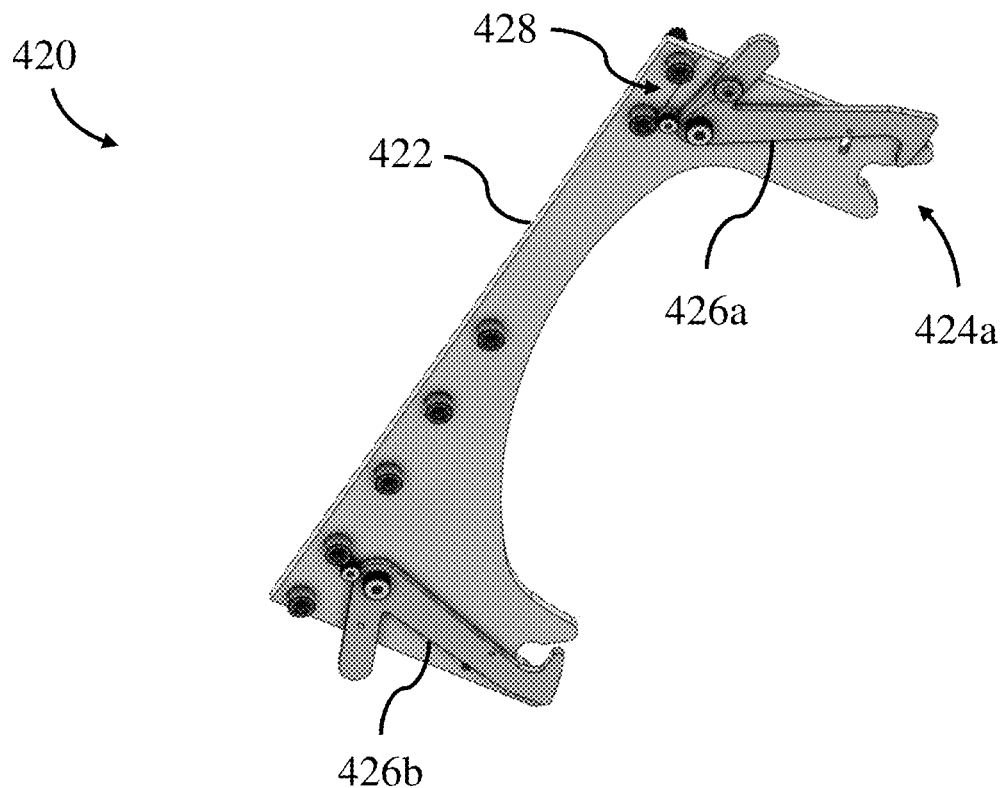
FIG. 4C is a bottom perspective view of one embodiment of a robot interface of an accessory.
Figure 4D:
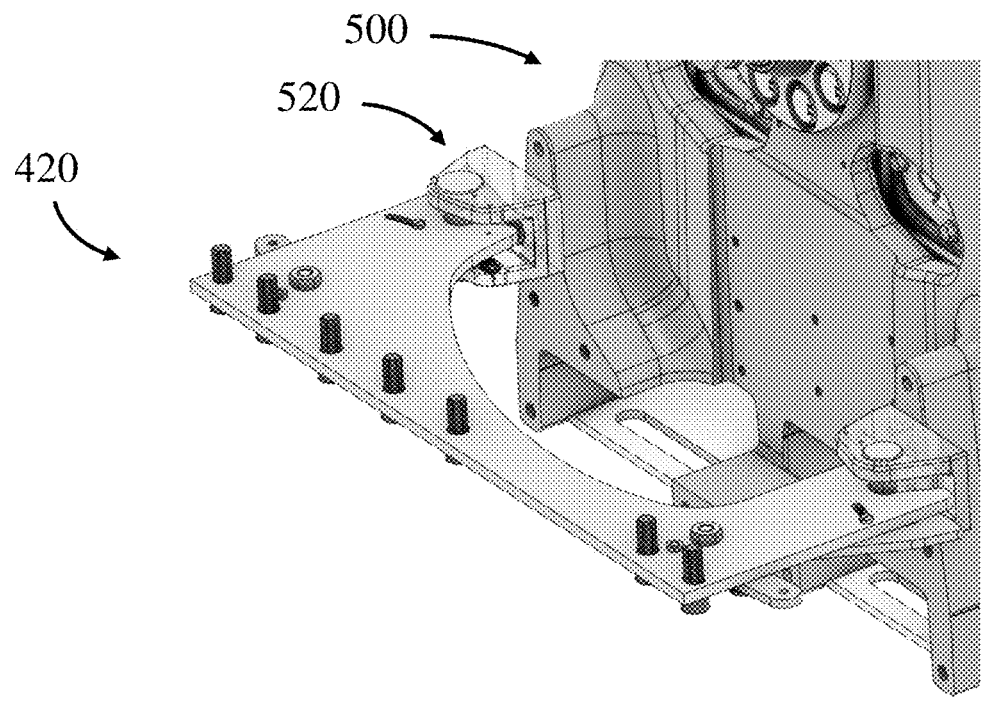
FIG. 4D is a top perspective view of the robot interface of FIG. 4C coupled to an accessory interface of a robot.

One embodiment of a robot interface 420 of an accessory is shown in isolation in FIG. 4C, and is shown coupled to a mechanical interface 520 of a robot 500 in FIG. 4D. It should be appreciated that although the robot interface 420 is shown as a portion of a cart accessory 400 in FIGS. 4A and 4B, a robot interface 420 may be associated with any suitable accessory, and need not be limited to a cart accessory. Referring first to FIG. 4C, the robot interface 420 includes a main body 422, at least one receiving area 424, and at least one latch 426. Each receiving area 424 is configured to receive a mating portion (e.g., a pin) of a mechanical interface of a robot, as described below in reference to FIG. 4E. Each latch 426 is configured to secure the mating portion of the mechanical interface of the robot after the mating portion is received in the receiving area 424. In the embodiment of FIG. 4C, the robot interface 420 includes two receiving areas 424a and 424b (not labeled for clarity) and two associated latches 426a and 426b. However, it should be appreciated that robot interfaces with more or fewer receiving areas and/or latches are contemplated, and the disclosure is not limited in this regard. The robot interface 420 additionally includes one or more springs 428 (e.g., a torsion springs) configured to bias the associated latches 426 to a closed configuration.

Turning to FIG. 4D, a robot interface 420 of an accessory is coupled to a mechanical interface 520 of a robot 500. As shown in greater detail in FIGS. 4E and 4F, a mechanical interface 520 of a robot 500 includes a pin 524 configured to be received in the receiving area 424 of the robot interface 420 of the accessory. As described above in reference to FIG. 4C, a latch 426 is configured to secure the pin 524 in the receiving area 424.

Figure 4E:
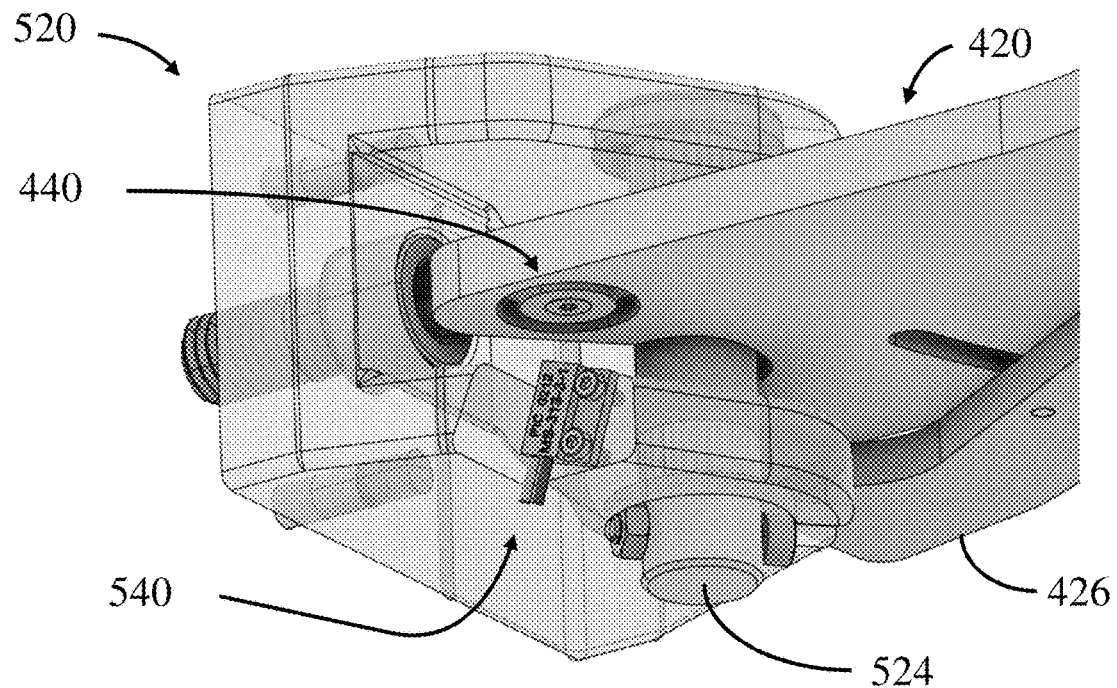
FIG. 4E depicts one embodiment of a coupling sensor.
Figure 4F:
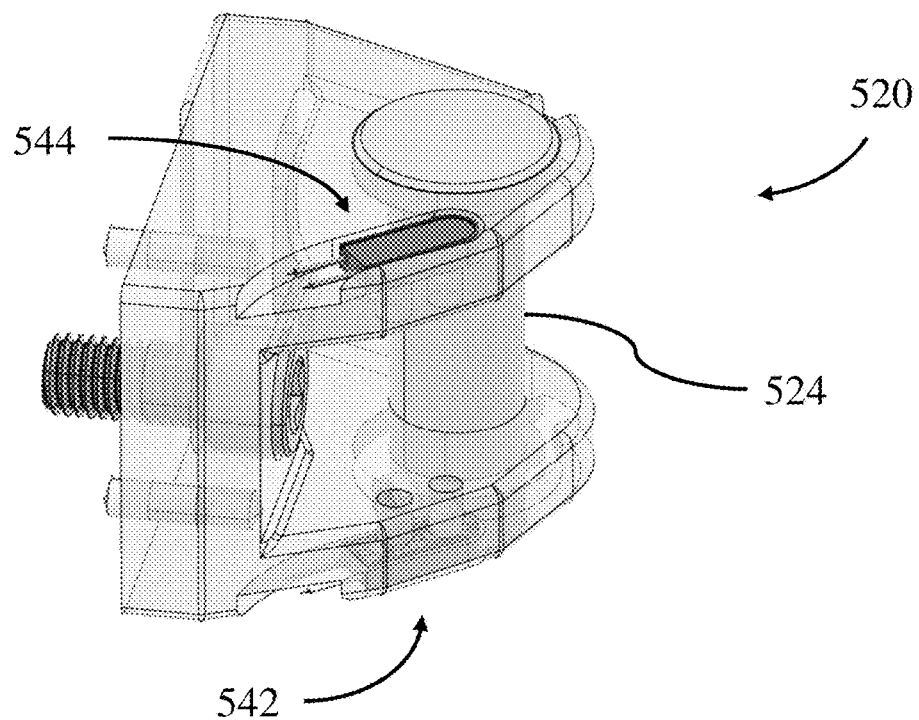
FIG. 4F depicts another embodiment of a coupling sensor.

FIGS. 4E and 4F illustrate different embodiments of a coupling sensor. A coupling sensor may be configured to determine if a robot and an accessory are physically coupled through a mechanical interface of the robot. In some embodiments, the coupling sensor may be a magnetic sensor, such as a hall effect sensor or a reed switch. For example, FIG. 4E depicts a coupling sensor 540 disposed on a portion of a mechanical interface 520. The coupling sensor 540 is configured to sense the presence or absence of a magnet 440 disposed on a portion of a robot interface 420 of an accessory. In some embodiments, a coupling sensor may be a contactless sensor. While a contactless sensor may include the magnetic sensors described above, a contactless sensor may include other sensor configurations. For example, a contactless sensor may include an emitter/receiver pair. FIG. 4F shows one embodiment of a coupling sensor that includes an emitter 542 configured to emit energy (e.g., an IR beam) and a receiver 544 configured to receive the energy emitted by the emitter. When the robot interface 420 is coupled to the mechanical interface 520, the energy emitted from the emitter is blocked from reaching the receiver, thereby providing a signal indicative of coupling. It should be appreciated that other types of coupling sensors are contemplated, and the present disclosure is not limited to magnetic and/or contactless coupling sensors.

The embodiment of a cart accessory 400 shown in FIGS. 4A and 4B is a passive cart accessory without any powered components. Accordingly, the robot interface 420 shown in FIGS. 4A-4E is only configured to couple to a mechanical interface of a robot (e.g., the mechanical interface 520 of FIGS. 4D-4F). As another example, a conveyor accessory may be configured to couple to a robot through a mechanical interface. In some embodiments, robot interfaces on different accessories (e.g., cart accessories and conveyor accessories) may be similarly arranged, such that different accessories may couple to the same accessory interface (e.g., the same mechanical interface) of a robot. In some embodiments, different accessories may have different robot interfaces, and a robot may have different accessory interfaces (e.g., different mechanical interfaces) for different accessories. For example, a robot may include a first accessory interface configured to receive a first accessory (e.g., a cart accessory), and a second accessory interface configured to receive a second accessory (e.g., a conveyor accessory). The first accessory interface may include, for example, both a first electrical interface and a first mechanical interface (e.g., if the cart accessory is a powered cart accessory). The second accessory interface may include a mechanical interface but no electrical interface (e.g., if the conveyor accessory is unpowered). Regardless of the types of interfaces (e.g., mechanical and/or electrical) that the first and second accessory interfaces include, either interface may additionally include a coupling sensor configured to determine if the associated accessory is coupled to the robot. In some embodiments, the first and second mechanical interfaces may be differently configured. That is, the first mechanical interface may be incompatible with the second accessory such that the second accessory cannot couple to the robot through the first mechanical interface. Similarly, the second mechanical interface may be incompatible with the first accessory such that the first accessory cannot couple to the robot through the second mechanical interface.

In some embodiments, different accessory interfaces may be disposed on different sides of a robot. For example, a cart accessory interface may be disposed on a first side of a robot, and a conveyor accessory interface may be disposed on a second side of the robot, which may be opposite the first side. Such a configuration may be advantageous in consideration of other components of the robot. For example, it may be desirable to be able to charge the robot through a battery charging port while the robot is coupled to a cart accessory, but it may be less important to be able to charge the robot through while the robot is coupled to a conveyor accessory. Accordingly, the cart accessory interface may be disposed on a side of the robot that does not interfere with the battery charging port.

While the examples described above include accessories configured to couple to a robot through a mechanical interface, an accessory (e.g., a cart accessory) may include electrical components, and may be configured to couple to both an electrical interface and a mechanical interface of a robot. For example, a cart accessory may include one or more actuators configured to steer and/or drive the wheels of the robot, or may include an actuator configured to control a turntable of the cart accessory. The robot may transmit power to the actuators (or other components) of the accessory through the electrical interface, and/or may transmit signals (e.g., motor commands) to a controller associated with the actuators. Alternatively or additionally, an accessory may include sensors and/or indicators (e.g., lights) that are configured to be powered when connected to the robot through the electrical interface, or that may transmit data to the robot through the electrical interface. It should be appreciated that power may be transmitted from the robot to the accessory through the electrical interface, or, in some embodiments, power may be transmitted from the accessory to the robot through the electrical interface. For instance, in some embodiments, the accessory may include a battery charging system that, when coupled to the electrical interface of the robot, enables charging of one or more batteries of the robot. It should also be appreciated that data may be transmitted through the electrical interface from the robot to the accessory or from the accessory to the robot, as the disclosure is not limited in this regard.

An electrical interface on a robot may, in some embodiments, include an electrical connector configured to couple to a corresponding electrical connector of an accessory. It should be appreciated that any suitable electrical connector with any suitable number and/or configuration of pins, and any suitable communication protocol may be included in an electrical interface, as the disclosure is not limited in this regard.

In some embodiments, a robot may be configured to receive information from an accessory that identifies the accessory. For example, a processor of the accessory may send information to a processor of the robot though the electrical interface, or the robot may read an identifier tag of the accessory such as a barcode or an RFID tag (which may be used to identify an accessory that is unpowered and/or not coupled to the robot through an electrical interface). The identifying information may include information relating to the type of accessory (e.g., whether the accessory is a cart accessory or a conveyor accessory), the geometry and/or size of the accessory, or any other information relevant to the operation of the robot when the robot is coupled to the accessory.

In some embodiments, a processor (e.g., a processor of a robot) may ensure consistency between various signals and/or information. For example, if an identifier tag is read and indicates that the accessory type is a powered cart accessory, the processor may check to confirm that the accessory is coupled to the robot both mechanically (e.g., by checking the status of a coupling sensor of a mechanical interface) and electrically (e.g., by checking if electrical signals are received through an electrical interface). The processor may enter an error state if a discrepancy is detected, such as when an accessory is identified as a powered cart accessory, but the accessory is only determined to be coupled mechanically and not electrically.

In some embodiments, a robot may be configured to adjust an operation of the robot based on information received from an accessory. For example, the robot may adjust an operation of the robotic arm or of the mobile base based on information relating to the size of the accessory, as the size of the accessory may influence how the robot navigates a warehouse floor. Similarly, a robot may adjust one or more safety protocols based on the received information, such as accessory size information. Certain specific considerations relating to safety with an attached accessory are described below.

In some embodiments, a mobile base may include sensors to help the mobile base navigate its environment. In the embodiment shown in FIGS. 1A and 1, the mobile base 110 of the robot 100 includes distance sensors 116. The mobile base includes at least one distance sensor 116 on each side of the mobile base 110. A distance sensor may include a camera, a time of flight sensor, a LiDAR sensor, or any other sensor configured to sense information about the environment from a distance. In embodiments of a mobile base that include distance sensors with an associated field of view (e.g., cameras, LiDAR sensors), the fields of view of the distance sensors may overlap to provide a full 360-degree view of the environment around the robot. For example, a mobile base may be rectangular, and each of the four sides may be associated with a distance sensor. The locations of the distance sensors and the associated fields of view may be arranged such that the field of view of each distance sensor at least partially overlaps the fields of view of the two neighboring distance sensors. In some embodiments, fields of view may not overlap continuously to enable full 360-degree sensing, but, nonetheless, at least one field of view may at least partially overlap a second field of view. In some embodiments, a field of view may be associated with an angular value and/or a distance. In some embodiments, a field of view may be associated with a sector of a circle.

Figure 5A:
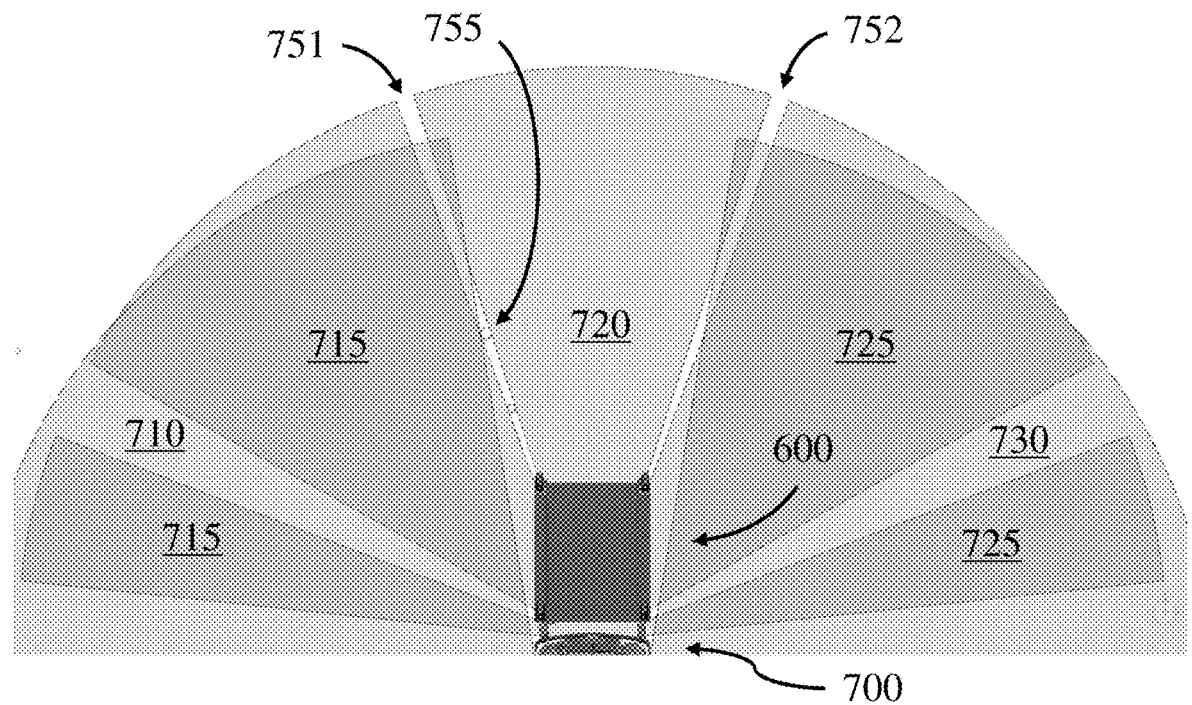
FIG. 5A is a top view of one embodiment of overlapping fields of view of distance sensors of a robot.
Figure 5B:
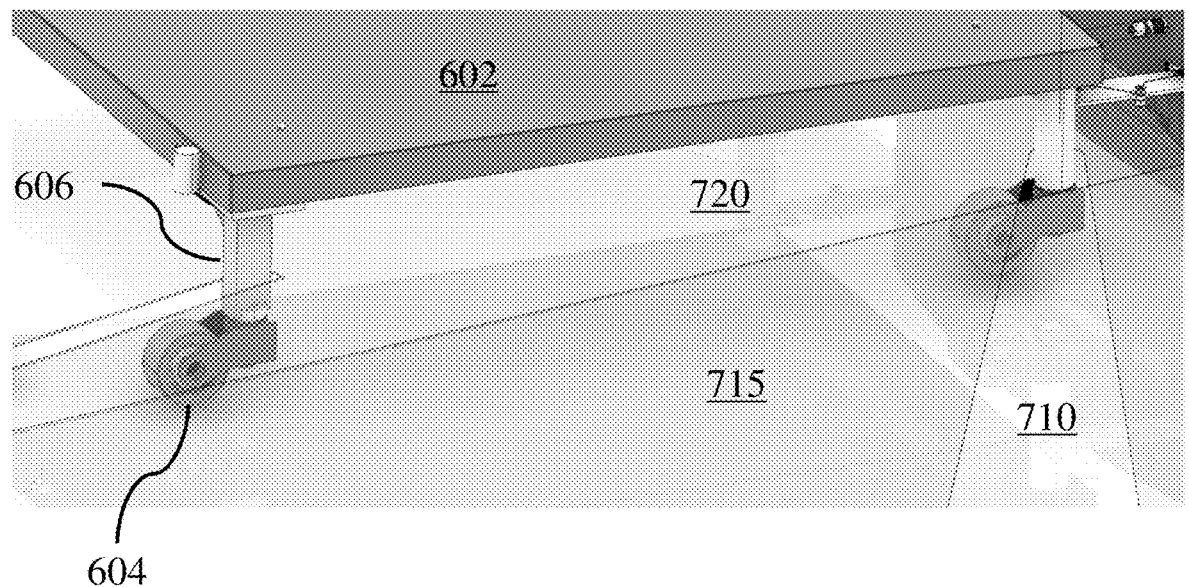
FIG. 5B is a perspective view of the overlapping fields of view of FIG. 5A.

Referring now to FIGS. 5A and 5B, an attached accessory may occlude a portion of a field of view of a distance sensor. FIG. 5A depicts a robot 700 coupled to a cart accessory 600. The robot 700 includes multiple distance sensors, each of which is associated with a field of view. A first distance sensor on a first side of the robot 700 is associated with a first field of view 710 (indicated by the leftmost shaded sector in FIG. 5A), a second distance sensor on a second side of the robot 700 is associated with a second field of view 720 (indicated by the middle shaded sector in FIG. 5A), a third distance sensor on a third side of the robot 700 is associated with a third field of view 730 (indicated by the rightmost shaded sector in FIG. 5A). The first and second fields of view overlap in regions 715, while the second and third fields of view overlap in regions 725. At least one field of view may include an area on a side of the accessory opposite the side of the accessory that couples to the robot (e.g., at least one distance sensor may be configured to sense an area behind the accessory). In the embodiment of FIGS. 5A and 5B, the second distance sensor associated with the second field of view 720 is configured to sense an area under as well as behind the cart accessory 600.

As can be appreciated in FIG. 5B, portions of an accessory (such as the wheels 604 and/or legs 606 of a cart accessory 600 that couple the wheels 604 to the flat surface 602) may occlude portions of a field a view of one or more distance sensors on the robot 700. For example, as may be best seen in FIG. 5B, a leg of the cart accessory proximal to the robot occludes the second field of view 720, such that the second distance sensor is unable to sense an occluded area behind the leg (e.g., an area on a side of the leg opposite the distance sensor).

The inventors have recognized and appreciated that accessories may be designed and distance sensors may be arranged such that at least some of an area that is occluded from the field of view of one distance sensor may be included in the field of view of a different distance sensor, and such that the size of an area that is unable to be sensed by any of the distance sensors is limited. For example, as can be seen in FIGS. 5A and 5B, the majority of the area behind a proximal leg 606 (e.g., a leg proximal the robot 700) that is occluded from the second field of view 720 falls within the first field of view 710. Accordingly, the area occluded from the second field of view 720 by the proximal leg that is not contained within the first field of view 710 may be negligible.

In contrast, the areas behind the distal legs that are occluded from the second field of view 720 (e.g., occluded areas 751 and 752 in FIG. 5A) may include larger portions that are also not contained in either the first or third fields of view 710 and 730. However, the maximum "blindspot" (e.g., the area not included in the field of view of any distance sensor) may nonetheless be limited. In FIG. 5A, a blindspot with a maximum dimension (e.g., a maximum diameter) is indicated at 755. The maximum dimension of the blindspot may depend at least in part on the positions, sensing angles, and sensing distances of the distance sensors, as well as the size and position of occluding bodies (e.g., the legs of a cart accessory). Considering these and other variables, the inventors have recognized and appreciated that a blindspot may be limited to a maximum dimension. In some embodiments, the maximum dimension of a blindspot may be less than 100 millimeters, or, in some embodiments, less than 75 millimeters.

While some accessories may be configured to couple to a robot through only a mechanical interface or through both a mechanical interface and an electrical interface, as described in the examples above, some accessories may be configured to couple to a robot through only an electrical interface.

Figure 6:
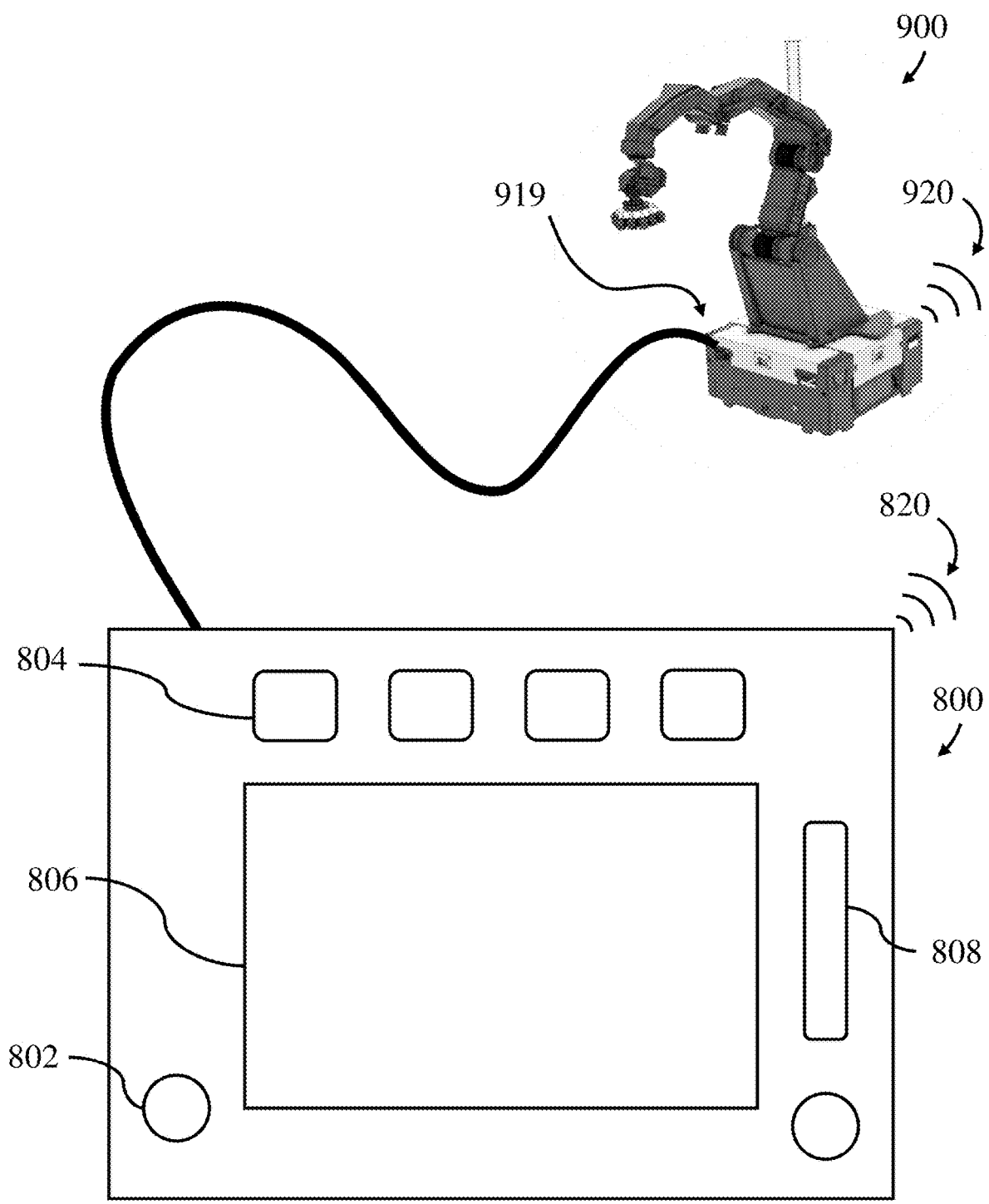
FIG. 6 depicts one embodiment of a pendant accessory.

FIG. 6 depicts one embodiment of a pendant accessory 800. As described above, the pendant accessory 800 may be configured to couple to a robot 900 through an electrical interface 919 of the robot. In some embodiments, a pendant accessory may couple to the robot through a dedicated pendant accessory interface, while in other embodiments a pendant accessory may couple to the robot through an electrical interface configured to couple to multiple types of accessories such as a universal accessory interface (e.g., a universal electrical interface). In some embodiments, the pendant accessory 800 may communicate with the robot 900 wirelessly (e.g., through a wireless electrical interface), such as through wireless communication modules 820 and 920 associated with the pendant accessory and the robot, respectively. In embodiments with a wireless electrical interface, the wireless communication protocol may include a handshake authentication protocol between the robot and the pendant accessory in order to establish a connection.

The pendant accessory 800 may be configured to enable a user to operate one or more control systems of the robot 900 through a user interface of the pendant accessory 800. For example, if the robot 900 is malfunctioning in some way (e.g., a disabled sensor is triggering safety protocols that prevent the robot from moving), the pendant accessory 800 may enable a user to manually operate some or all of the functions of the robot 900. In some embodiments, the pendant accessory 800 may override and/or deactivate one or more safety protocols of the robot 900 when the pendant accessory is connected to the robot through an electrical interface (e.g., electrical interface 919). Disabling safety protocols may enable a user to operate the robot 900 to perform certain tasks that may be unsafe for the robot to perform autonomously. In some embodiments, the pendant accessory 800 is powered by the robot 900 when connected to the robot through an accessory interface (e.g., the electrical interface 919).

The user interface of the pendant accessory 800 may include one or more joysticks 802, one or more buttons 804, and/or one or more touchscreens 806. The touchscreen 806 may, in some embodiments, be removable from the remainder of the pendant accessory 800. In such embodiments, the removable touchscreen 806 may be configured to be powered by the pendant accessory 800 when the touchscreen 806 is coupled to the remainder of the pendant accessory 800. It should be appreciated that different embodiments of pendant accessories may include different combinations of the above elements of a user interface. For example, some embodiments of a user interface of a pendant accessory may include at least one joystick and at least one button, but may not include a touchscreen. Some embodiments of a user interface of a pendant accessory may include a touchscreen, but may not include any joysticks.

The pendant accessory 800 includes a momentary switch 808 that enables operation of the pendant accessory. That is, the pendant accessory 800 may only be used to operate the robot 900 when the momentary switch 808 is activated. For example, a pendant accessory may be configured to override certain safety protocols of the robot, but the safety protocols of the robot may only be disabled when the momentary switch is activated.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the terms "physical processor" or "computer processor" generally refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

The invention claimed is:

1. A robot comprising:
a mobile base;
a robotic arm operatively coupled to the mobile base; and
at least one interface configured to enable selective coupling to at least one accessory, the at least one interface including:
  a first interface comprising:
    a first electrical interface configured to transmit power and/or data between the robot and a first accessory; and
    a first mechanical interface configured to enable physical coupling between the robot and the first accessory; and
  a second interface comprising:
    a second mechanical interface configured to enable a second physical coupling between the robot and a second accessory; and
    a first coupling sensor configured to determine if the robot and the second accessory are physically coupled through the second mechanical interface.

2. The robot of claim 1, further comprising a second coupling sensor configured to determine if the robot and the first accessory are physically coupled through the first mechanical interface.

3. The robot of claim 2, wherein the first coupling sensor and/or the second coupling sensor is a magnetic sensor.

4. The robot of claim 3, wherein the magnetic sensor is a hall effect sensor.

5. The robot of claim 3, wherein the magnetic sensor is a reed switch.

6. The robot of claim 2, wherein the first coupling sensor and/or the second coupling sensor is a contactless sensor.

7. The robot of claim 2, further comprising a computer processor configured to receive a signal from the second coupling sensor and output an error when it is determined based on the signal that the robot and the first accessory are physically coupled through the first mechanical interface and that an electrical connector of the first electrical interface is not connected to a corresponding connector of the first accessory.

8. The robot of claim 1, wherein the second mechanical interface is incompatible with the first accessory such that the first accessory cannot couple to the robot through the second mechanical interface.

9. The robot of claim 8, wherein the first mechanical interface is incompatible with the second accessory such that the second accessory cannot couple to the robot through the first mechanical interface.

10. The robot of claim 1, wherein the first mechanical interface is disposed on a first side of the robot, and wherein the second mechanical interface is disposed on a second side of the robot opposite the first side of the robot.

11. The robot of claim 10, further comprising a battery charging port disposed on the first side of the robot or the second side of the robot.

12. A system comprising:
a robot comprising;
  a mobile base;
  a robotic arm operatively coupled to the mobile base; and
  an accessory interface; and
a cart accessory operatively coupled to the robot through the accessory interface, the cart accessory comprising:
  a cart body having a flat surface on which one or more objects can be placed; and
  a plurality of wheels coupled to the cart body,
wherein the robot is configured to receive information identifying the cart accessory and adjust an operation of the robot based on the received information.

13. The system of claim 12, wherein the robot comprises one or more distance sensors, wherein the cart accessory includes a first side operatively coupled to the robot and a second side opposite the first side, the second side facing an environment, and wherein at least one distance sensor of the one or more distance sensors is disposed on the robot to have a field of view that includes an area of the environment that the second side of the cart accessory faces.

14. The system of claim 12, wherein the robot comprises a plurality of distance sensors, wherein a first field of view of a first distance sensor of the plurality of distance sensors at least partially overlaps a second field of view of a second distance sensor of the plurality of distance sensors.

15. The system of claim 14, wherein at least one of the plurality of wheels occludes an area of the first field of view when the cart accessory is coupled to the robot, wherein the second distance sensor is arranged such that the second field of view includes at least some of the occluded area of the first field of view.

16. The system of claim 15, wherein the first distance sensor and the second distance sensor are arranged on the robot such that a maximum dimension of a portion of the occluded area of the first field of view not included in the second field of view is less than a predetermined dimension.

17. The system of claim 16, wherein the predetermined dimension is 100 millimeters.

18. The system of claim 16, wherein the predetermined dimension is 75 millimeters.

19. The system of claim 12, wherein the robot comprises a distance sensor disposed on a same side of the robot as the accessory interface, wherein a field of view of the distance sensor includes an area under the cart accessory.

20. The system of claim 12, wherein the received information includes cart size information, and wherein the robot is configured to adjust an operation of the mobile base based on the cart size information.

21. The system of claim 12, wherein the received information includes cart size information, and wherein the robot is configured to adjust one or more safety protocols based on the cart size information.

22. The system of claim 12, wherein the robot comprises a reader configured to read an identifier tag located on the cart accessory, and wherein receiving information identifying the cart accessory comprises receiving the information in response to reading the identifier tag.

23. The system of claim 12, wherein the information identifying the cart accessory is received by the robot through the accessory interface.

24. The system of claim 12, wherein each of the plurality of wheels of the cart accessory is passive.

25. The system of claim 12, wherein at least one of the plurality of wheels of the cart accessory is configured to be actively steered and/or driven.

26. A method comprising:
mechanically coupling an accessory to a robot through a mechanical interface of the robot, the robot comprising a robotic arm operatively coupled to a mobile base;
sensing, using a coupling sensor, whether the robot and the accessory are mechanically coupled;
electrically coupling the accessory to the robot through an electrical interface of the robot;
determining whether the accessory is electrically coupled to the robot; and
transmitting information between the robot and the accessory through the electrical interface, wherein transmitting information between the robot and the accessory comprises transmitting accessory information from the accessory to the robot.

27. The method of claim 26, further comprising entering an error state when a computer processor determines, based on a signal from the coupling sensor, that the robot and the accessory are mechanically coupled and determines that the robot and the accessory are not electrically coupled.

28. The method of claim 26, further comprising adjusting an operation of the robot based on the transmitted accessory information.

29. The method of claim 28, wherein adjusting the operation of the robot comprises adjusting an operation of the mobile base and/or adjusting the operation of one or more safety protocols.

30. The method of claim 26, wherein transmitting information between the robot and the accessory comprises transmitting accessory size information from the accessory to the robot.

31. The method of claim 30, further comprising adjusting an operation of the robot based on the transmitted accessory size information.

32. The method of claim 31, wherein adjusting the operation of the robot comprises adjusting an operation of the mobile base and/or adjusting the operation of one or more safety protocols.

33. The method of claim 26, further comprising transmitting power between the robot and the accessory through the electrical interface.

* * * * *